(12) United States Patent
Matsur

(10) Patent No.: US 9,317,724 B2
(45) Date of Patent: Apr. 19, 2016

(54) INDUCTION VEHICLE DETECTION AND IDENTIFICATION SYSTEM, INDUCTION LICENSE PLATE, AND INDUCTION READER

(71) Applicant: Igor Yurievich Matsur, Tula (RU)

(72) Inventor: Igor Yurievich Matsur, Tula (RU)

( * ) Notice: Subject to any disclaimer, the term of this patent is extended or adjusted under 35 U.S.C. 154(b) by 206 days.

(21) Appl. No.: 14/346,730

(22) PCT Filed: Feb. 11, 2013

(86) PCT No.: PCT/RU2013/000096
§ 371 (c)(1),
(2) Date: Mar. 23, 2014

(87) PCT Pub. No.: WO2014/077726
PCT Pub. Date: May 22, 2014

(65) Prior Publication Data
US 2015/0041536 A1 Feb. 12, 2015

(30) Foreign Application Priority Data
Nov. 16, 2012 (RU) .............................. 2012148736

(51) Int. Cl.
| G06K 5/00 | (2006.01) |
| G06K 7/10 | (2006.01) |
| B60R 13/10 | (2006.01) |
| G08G 1/042 | (2006.01) |
| G08G 1/017 | (2006.01) |
| G06F 21/62 | (2013.01) |
| G06K 19/073 | (2006.01) |
| G06K 19/077 | (2006.01) |
| G07C 9/00 | (2006.01) |

(52) U.S. Cl.
CPC ............ *G06K 7/10267* (2013.01); *B60R 13/10* (2013.01); *G06F 21/6218* (2013.01); *G06K 7/10336* (2013.01); *G06K 19/07309* (2013.01); *G06K 19/07783* (2013.01); *G07C 9/00007* (2013.01); *G08G 1/017* (2013.01); *G08G 1/042* (2013.01)

(58) Field of Classification Search
USPC ......................................... 235/380, 382, 439
See application file for complete search history.

(56) References Cited

U.S. PATENT DOCUMENTS

| 6,958,676 B1* | 10/2005 | Morgan ............... G07B 15/063 235/380 |
| 2012/0056725 A1* | 3/2012 | Muriana ................ G08G 1/017 340/10.51 |

* cited by examiner

*Primary Examiner* — Rafferty Kelly
(74) *Attorney, Agent, or Firm* — Bardmesser Law Group

(57) ABSTRACT

An induction vehicle detection and identification system comprising electronic identification devices with electronic memory, mounted on vehicles, and a reader capable of reading and/or writing data obtained from devices in HF-band. Devices have a non-volatile memory and are integrated into the vehicle's license plate. The reader combined with a magnetic frame is in a dielectric casing, which is mounted under the roadway. It generates an alternating magnetic field, which determines the detection and identification range. Minimum time the reader requires to read discrete responses generated by electronic identification devices and to identify the vehicle is less than 25 ms. The identification devices and the reader exchange data at the rate of 1 Kbit/sec or higher, and provide data encoding and decoding, as well as data access restriction.

6 Claims, 2 Drawing Sheets

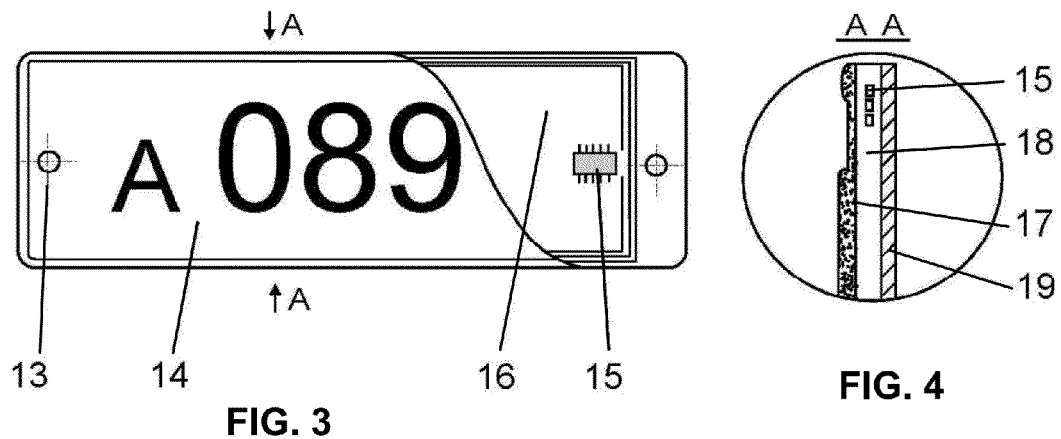
FIG. 3
FIG. 4
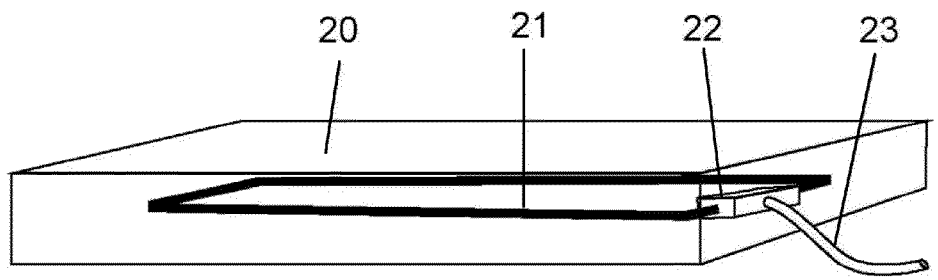
FIG. 5
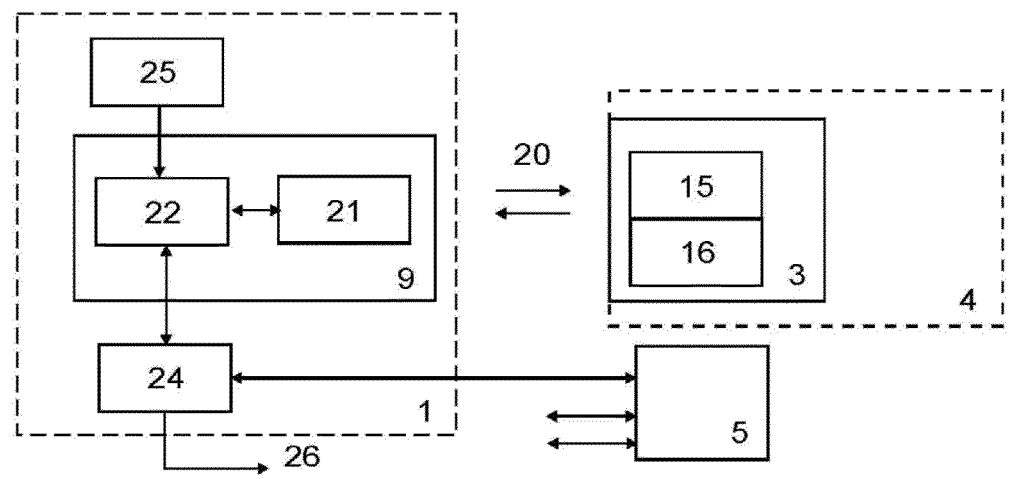
FIG. 6

INDUCTION VEHICLE DETECTION AND IDENTIFICATION SYSTEM, INDUCTION LICENSE PLATE, AND INDUCTION READER

CROSS-REFERENCE TO RELATED APPLICATIONS

This application is a US National Phase of PCT Application No. PCT/RU2013/000096, filed on Feb. 11, 2013, which claims priority to RU 2012148736, filed on Nov. 16, 2012, which are all incorporated by reference herein in their entirety.

BACKGROUND OF THE INVENTION

1. Field of the Invention

The present invention relates to traffic control and registration by means of vehicle identification.

2. Background of the Related Art

A conventional approach to traffic control is to use an automated vehicle identification system, comprising electronic identification devices mounted on vehicles and electronic reading and writing devices, both equipped with an induction transmitter and receiver. Electronic identification devices also include: at least one HF-band transmitter with range of 10-90 cm, at least one UHF-band transmitter with range of 300-1000 cm, and an electronic memory unit (see US20120056725).

This system has a number of disadvantages:

1. It is overly complex, since it requires using both HF and UHF bands to connect electronic identification devices mounted on vehicles and electronic reading devices.

2. UHF-band antennas can't be placed under the roadway because of high wave attenuation. They can't be placed on the roadway as well, because certain weather conditions, such as rain, mud, snow and ice, decrease their range and reliability by increasing wave attenuation and distorting the orientation diagram of their electromagnetic fields. A UHF-band RFID-system comprising a transponder, an antenna and a reader is operable only under conditions of radio visibility, while large objects, such as vehicles or houses, whose size is proportionate to the wavelength, can cause a complete loss of signal, as they shield electromagnetic waves, or can cause interference leading to signal distortion.

To enable the system to identify vehicles, it is necessary to construct posts or farms over the road, where reader antennas with transponders can be mounted. However, such constructions do not solve the problem of interference for UHF band, which leads to connection failures and decreases reliability of the system. Interference also makes it difficult to locate the vehicle on the road. Moreover, any construction over the road or at the roadside affects the architectural look of the site.

3. HF RFID-readers equipped with antennas, such as long-range induction systems, can read information from standard transponders at the distance of 80-90 cm. But the size of such antennas should be at least ten times less than the wavelength of the induction system to get focused parameters. Thus, the typical range of a standard frame antenna forming a magnetic field with intensity of at least 150 mA/m for standard transponders, can't exceed the box with dimensions of 800×600×800 mm. The perimeter of such antenna should be equal to ⅛ of the wavelength (see, e.g., HF Long Range reader ID ISC.LR(M)2500 by FEIG Electronic). Such range is insufficient for identification of fast-moving objects, even those equipped with transponders, because the time required to read identification data exceeds the time a vehicle with transponder needs to pass through the antenna range. Even if positioned across the road, this antenna won't still be able to cover the entire lane.

4. Such systems have a very short range, and the sizes of vehicles can vary within meters, thus if the antenna is placed over the road or at the roadside, it can't provide reliable vehicle detection. Moreover, any constructions over the road or at the roadside affect the architectural look of the site and compromise traffic safety.

5. If an HF-band antenna is placed under the roadway, i.e., in a conductive environment (grounded conductor), it is exposed to stray capacitance and stray currents, which distort the frame, decreasing its Q-factor and shifting its resonant frequency. It is thus impossible to tune the system properly, which is why it can't function as needed.

These disadvantages thus limit the application of this solution.

Another conventional approach comprises a license plate implemented as a dielectric plate (see U.S. Pat. No. 5,621,571). Its uppermost layer is reflective and covered with a combination of letters and numbers for visual recognition. The underlying dielectric layer has an antenna, which is capable of transmitting and receiving a 915 MHz frequency signal and is equipped with a connecting feeder.

This approach can also be used for radio-frequency identification of a vehicle.

The problem of this approach is that it is impossible to make the license plate autonomous, since its antenna requires an extra connection. Such connections pose difficulties when mounting the plate, decrease its reliability, lead to signal losses, and make it impossible to operate in a passive mode.

Another problem is the need to excite the transmitter, which is already rather powerful, since a separate antenna unit requires high-frequency operation (in this case, 915 MHz). At such frequencies, there is high signal attenuation, and thus it is difficult, or even impossible, for the license plate to operate in passive mode in radio-frequency communication.

Moreover, if a high carrier frequency is used, its wavelength can be proportionate to the size of the license plate, and thus it is prone to negative effects of multiple reflections and shadowing caused by nearby objects (e.g., other vehicles). Multiple reflections distort the antenna orientation diagram, which makes it difficult, or even impossible, to detect and locate the plate, thus decreasing its reliability when interacting with vehicle identification systems.

These disadvantages thus limit the application of the device.

Another conventional device is a sensor implemented as an induction frame and placed under the roadway (see U.S. Pat. No. 3,651,452). When a vehicle enters its range, its inductive impedance is disturbed. The other constituent parts of the known device are: a fixed frequency generator, matching devices, which are able to generate a monitoring signal if there is a vehicle nearby, and devices reacting on that signal.

This device is able to register a vehicle moving past the induction frame.

However, the conventional device has the following disadvantages:

1) it can't identify vehicles, since it doesn't comprise any means of signal decoding;

2) its reliability is low, as it can register two vehicles moving closely to each other as one vehicle, or there can be errors in registering oversized vehicles;

3) there is a high chance for the device to miss a small-sized vehicle;

4) the device can malfunction because of a sudden change in weather conditions;

5) the induction frame is in no way protected from mechanical impact of moving vehicles; it is thus prone to breakdowns and has a low durability.

These disadvantages thus limit reliability and application of the device.

SUMMARY OF THE INVENTION

Accordingly, the objective of the invention is to to simplify the system and to make it single-band. Another objective is to use a magnetic frame placed under the roadway instead of antenna fixtures over the road or at the roadside. In addition, there is an objective to provide safe and reliable functioning of the system to detect and identify fast-moving vehicles.

To achieve the objective, an induction vehicle detection and identification system comprises electronic identification devices with electronic memory, mounted on vehicles, and a reader capable of reading and/or writing data obtained from devices in HF-band. It features devices integrated into the vehicle's license plate, embodied as resonators containing a multi-turn frame connected to a microchip, powered by electricity induced by an external alternating magnetic field. A non-volatile memory unit stores identification data of vehicles, containing at least their license plate number.

The reader, equipped with a magnetic frame with the perimeter whose length from ⅓ to ½ of wavelength, is put into a dielectric casing, which is mounted under the roadway up to 1 m deep. It generates an alternating magnetic field, which determines the detection and identification range. When signals reaching the frame are excited with power of up to 1 W, the range is 2 m long, reaches up to 1 m above the roadway and is as wide as the roadway. A minimum time the reader requires to read discrete responses generated by electronic identification devices and to identify the vehicle is less than 25 ms and proportionate to the vehicle speed (up to 250 km/h).

The embodiments of identification devices and the reader enable them to exchange data at the rate of 1 Kbit/sec. These embodiments also provide the functions of data encoding and decoding, as well as data access restriction.

In addition:

the microchip is implemented as a CPU with integral circuit base and a non-volatile memory unit in a single case. It acts as both modulator and demodulator of the signals;

the non-volatile memory unit stores the license plate number of vehicle, as well as information about the owner, his/her driver's license and warrant of fitness of the vehicle, and cargo characteristics;

the license plate is implemented as a dielectric plate framed in a multi-turn frame and covered with an identifying combination of letters and numbers for visual recognition;

the reader with a magnetic frame is capable of reading identification data from at least 4 electronic identification devices, that are in the range of the frame, simultaneously;

the reader provides for data exchange with electronic identification devices according to ISO-15693-3 standard (or compatible);

the reader and electronic identification devices are able to exchange data at the rate of 1 Kbit/sec or higher;

a vehicle is detected when the reader receives its identification code;

a vehicle is detected when it disturbs the field around the magnetic frame upon entering its range;

the signals reaching the frame are excited with a power of up to 20 W;

the reader is connected to a computer and can perform data exchange at the rate of 19.2 Kb/sec or higher;

the computer contains computing and processing devices to process identification data of a vehicle and use it to control traffic;

the reader is connected to the computer via an RS232 interface unit (or similar);

the computer and/or reader are equipped with a power supply;

the computer can be connected to a number of readers mounted at different portions of the road;

the magnetic frame range is 3-3.75 m wide, so as to conform to the width of the lane of the road it is placed at;

the reader with a magnetic frame is placed at the entrance and the exit of an enclosed area (including parking lots) with 2.5-3 m wide passages;

the reader generates signals to control turnpikes, gates, road barriers, or sliding electromechanical stubs;

the reader is synchronized with visual recognition devices to check the license plate image against identification data stored in the memory unit;

electronic identification devices and the reader are capable of checking the identification data received;

electronic identification devices and the reader are capable of restricting access to data by means of encoding and decoding.

Accordingly, the objective of the invention is to to make the system autonomous and operable in passive mode, as well as to increase its reliability by decreasing its operating frequency range and integrating it into induction HF-band vehicle identification system of ultra-long range.

To achieve the objective, an induction vehicle's license plate is implemented as a dielectric plate covered with an identifying combination of letters and numbers for visual recognition. It features an integrated microchip and a non-volatile memory unit with capacity of 64 bit or more to store identification data of a vehicle, at least, its license plate number. The plate is framed in a multi-turn frame, which is connected to the microchip, so as to make up an HF-band electromagnetic oscillation resonator with Q-factor of 20 or more. The resonator also functions as a microchip's power supply, when the average intensity of an external magnetic field at resonator's resonant frequency is 10 mA/m or more. The microchip generates modulating signals, as well as modulates/demodulates resonator's alternating current, encodes/decodes signals, and restricts access to data stored in the non-volatile memory unit.

the microchip is implemented as a CPU-based integral circuit;

the non-volatile memory unit can be re-programmed, stores identification data of vehicles and is capable of modulating resonator's alternating current;

the non-volatile memory unit is integrated into the microchip's case;

the multi-turn frame is connected to the microchip by transformer or galvanic method;

the multi-turn frame is made of conducting materials, e.g., as metallic band or tube with a rectangular, round or complex profile;

the multi-turn frame frames the plate, protruding over its edges;

the dielectric plate's backside is covered with a magnetic layer;

the induction license plate's front side, covered with an identifying combination of letters and numbers for visual recognition, is reflective;

the microchip has a SAW structure;

the microchip is capable of implementing anti-collision ISO 15693, 1800-3 protocols (or compatible);

the microchip-generated modulating signal's spectrum width should provide for data exchange at a rate of 1 Kbit/sec or higher;

the microchip is capable of encoding data to restrict access to its non-volatile memory unit;

the induction license plate has holes to be mounted on the vehicle as stipulated in state standards for regular license plates;

the dielectric plate is multi-layered;

the induction license plate is of the same size and appearance as a regular license plate;

the induction license plate can be mounted on the vehicle with at least 10 cm gap.

Accordingly, the objective of the invention is to to provide for identification of moving vehicles and increase reliability of the system.

To achieve the objective, an induction reader comprises a magnetic frame placed under the roadway, which features a signal generator and processor and a matching node, both connected to the frame. The frame makes up a rectangular HF-band oscillating circuit made of conducting materials. Its outer surface perimeter of cross-section is 10-100 mm, the ratio between its shorter side to its longer side is ⅓ to ⅛, and the perimeter whose length from ⅕ to ½ of wavelength. The longer side of the frame should be oriented to be across the road lane. The frame is enclosed in a dielectric case, implemented as a 50-200 mm high box and placed about 1000 mm deep under the roadway. The dielectric layer separating the frame from its environment is 50-200 mm wide.

The signal generator and processor modulates/demodulates, as well as encodes/decodes signals, and restricts access to data stored in memory.

In addition:

the dielectric case of the frame has a dielectric coefficient of 1-5, and its dielectric loss tangent is less than $10^{-2}$-$10^{-3}$;

the frame is made of a metallic band, which is at least 0.1 mm wide;

the frame is made of a metallic tube with a rectangular, round, or complex profile;

the matching node's case is dielectric, and its dimensions are about 200×120×70 mm;

the matching node is connected to signal generator and processor via a control and power cable;

the oscillating circuit of the induction reader is self-adjusting;

the signal generator and processor is capable of restricting data access by means of encoding;

the signal generator and processing node can also verify the received data;

the reader can be remotely adjusted, either manually or automatically, by changing frame parameters;

the case of the magnetic frame is resistant to vibration, precipitation, corrosive fluids and mediums, sand-salt mix, petrol, mold, and can sustain temperatures of 170° C. or more while being laid under the roadway;

the case of the magnetic frame can sustain pressure of a wheelset of 10 ton of more;

the reader is connected to a computer.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 3 illustrates the induction license plate, front view.

FIG. 4 illustrates the induction license plate in section, side view.

FIG. 5 illustrates the magnetic frame in a dielectric case.

FIG. 6 is a schematic diagram of the induction vehicle detection and identification system.

DETAILED DESCRIPTION OF EMBODIMENTS OF THE INVENTION

Figure 1:
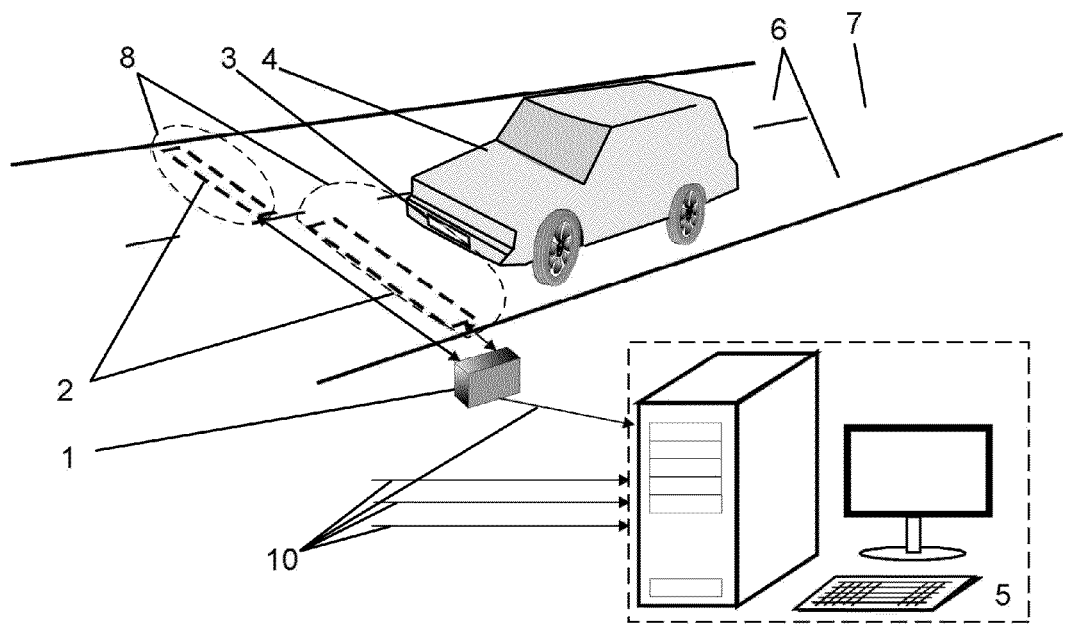
FIG. 1 is a diagram for placing the reader and the magnetic frame in relation to the road.

Reference will now be made in detail to the embodiments of the present invention, examples of which are illustrated in the accompanying drawings.

An induction vehicle detection and identification system comprises:

an electronic vehicle identification device with a magnetic frame;

a microchip with non-volatile memory for storing identification data of a vehicle with capacity of at least 64 bit;

a reader to read data from electronic vehicle identification devices.

An electronic vehicle identification device is integrated into the license plate, thus making up an induction license plate mounted at the same place as a regular one.

The front side of an induction license plate is covered with identification data plate number for visual recognition.

The reader is equipped with a magnetic frame placed under the roadway up to 1 m deep. It can read information from the lane above. The frame is connected to a reader's generator, which feeds an alternating signal with 1-20 W power, creating an alternating magnetic field of at least 10 mA/m intensity around the frame, which represents its detection and identification range, where the reader can read data from the induction license plate of a vehicle moving through the range of the frame at speed of up to 250 km/h.

The range of the frame, if it is uncovered with pavement, is at least 2.2 m.

When placed under the roadway, it reaches at least 1 m above the road. Thus, the range of the frame, placed under the roadway up to 1 m deep and interacting with an induction license plate, is at least 2 m. This fact characterizes the present vehicle detection and identification system as one being of ultra-long range.

The reader receives data in discreet packages from the induction license plate of a vehicle according to the ISO-15693-3 standard (or compatible). The minimum time needed to read the packages received and to identify the vehicle is up to 25 msec, so that it is proportionate to the speed of the vehicle, which should be up to 250 km/h.

The reader capable of simultaneously reading identification data from at least 4 electronic identification devices that are in the range of the frame. The reader is connected to a remote computer, functioning as a server, via an RS232 interface unit (or better) providing data exchange rate of at least 19.2 Kbit/sec.

The computer contains computing and processing devices to process identification data of a vehicle and use it to control traffic. The remote computer and/or reader are equipped with a power supply.

Readers with magnetic frames are placed at different portions of the road. The computer should be able to connect to one reader, to several ones, or to all of them at once.

The system functions as follows:

The vehicle is to be equipped with an induction license plate comprising: electronic vehicle identification devices, a passive resonator (a multi-turn frame and a microchip with a non-volatile memory).

At specific portions of the road, magnetic frames connected to a reader are to be placed under the roadway. The frames generate an external (for the resonator) alternating magnetic field of HF-band frequency (3-30 MHz).

Placing the magnetic frame under the roadway, one needs to consider the environment effect, which increases according to the size of the antenna. This size is to correspond to the width of the lane (up to 3.75 m on some roads).

The frame should be placed at some depth in order to provide safety for fast-moving vehicles. The frame should be placed at least 20 cm deep under the roadway in order to avoid destruction of the pavement.

The system comprises multiple magnetic frames placed at various portions of the road and provides for detecting vehicles at specific locations. A vehicle can be located with high precision, which is determined by the range of the frame and identification time span (2 m and 2 msec correspondingly at max speed of 250 km/h).

Vehicle data can be collected from different portions of the road and stored for further analysis. The system can determine the direction in which a vehicle was moving. It can also calculate time a vehicle required to pass between two points—and its speed, if the distance between them is known.

The magnetic frame has a much longer perimeter than those used in conventional systems because of the designed ratio of $1/5$ to $1/2$ between the perimeter and wavelength. This allows the frame to cover the entire lane.

At the same time, there is a multi-turn frame along the perimeter of the license plate, which is larger than regular transponders. The resonator is thus much larger, and vehicle identification devices are at least ten times more sensitive than conventional ones. This provides for ultra-long-range functioning of the present system.

When a vehicle equipped with an induction license plate enters the range of the magnetic frame, where intensity of the magnetic field is more than 10 mA/m, which is enough to trigger the resonator's microchip, the microchip generates the modulating signal, which manipulates the resonator's oscillations, which, in turn, disturb the magnetic field. The modulating signal includes data stored in the non-volatile memory. The magnetic field thus created represents discrete coded messages containing identification data of the vehicle.

The magnetic field disturbed by the response is transformed into an electric current, which is transferred to the reader for demodulation. The reader detects passing vehicles by demodulating and decoding the signal received. This information is then sent via wired or wireless communication lines to a computer for further processing.

Vehicles can also be detected based on the disturbances they cause by passing through the alternating magnetic field.

When there are multiple vehicles equipped with induction license plates in the range of the same reader, their resonators generate unique signals with resonant frequency modulations. Signals from different resonators are the processed discretely, one at a time, according to anti-collision ISO 15693, 1800-3 protocols (or compatible), to increase reliability of the demodulation process by providing reasonable signal/noise proportion. The reader generates controlling signals at the same resonant frequency, which are then demodulated by the microchip to generate a modulating signal.

The present system can also be used to control access to enclosed or restricted areas, such as parking lots. In that case, readers with magnetic frames are to be placed at entrances and exits, including 2.5-3 m wide passages. Also, the reader connected to the system, should be able to control turnpikes, gates or any other kind of barrier.

When the system is used for traffic control, it can be augmented, if necessary, with means for visual recognition of license plates, such as photo/video cameras synchronized with the reader. The data obtained from the reader is then checked against the visual identification signs and identification data of the vehicle stored in memory of the license plate's microchip.

The present system is single-band and operates in a low-frequency HF band. Magnetic frames placed under the roadway remove the necessity to place antennas over the road or at the roadside. In the same time, the range of the frame is large enough to provide for reliable detection and identification of vehicles. In fact, the system can be classified as an ultra-long-range HF-band one.

The system can be implemented using standard components and radio elements, and either wired or wireless communication lines. The reader can be produced on the basis of existing components, such as HF Long Range reader ID ISC.LR(M)2500 by FEIG Electronic.

Therefore, the induction vehicle detection and identification system has a much broader application, since it is simpler and single-band. In addition, it doesn't require placing antenna fixtures over the road or at the roadside, since it comprises a magnetic frame placed under the roadway. The system also provides safe and reliable detection and identification of fast-moving vehicles.

An induction license plate is implemented as a rectangular plate made of a dielectric material, with fixture holes, the size and attributes of a regular license plate as stipulated in state regulations. Its front side is reflective and covered with a combination of letters and numbers for visual recognition. Inside the plate, there is a multi-turn frame with some gap from the edges of the plate, having transformer or galvanic connection to the integrated microchip. Combined, the frame and the microchip make up an HF-band (3-30 MHz) alternating magnetic oscillation resonator. The resonator stores energy to power the integrated microchip, which modulates frequency of resonator's magnetic oscillations. Intensity of an external magnetic field, which gives electric current enough induction to power the microchip, is at least 10 mA/m.

The microchip comprises a CPU and a non-volatile memory unit with capacity of at least 64 bits to store identification data of a vehicle. It functions as a modulator of resonator's harmonic oscillations with bandwidth necessary to provide data exchange rate of at least 1 Kbit/sec. Its other function is to demodulate the control signal of the external magnetic field and to provide implementation of anti-collision ISO 15693, 1800-3 protocols (or compatible) in case there are multiple induction license plate close together.

An induction license plate is implemented as a uniform dielectric plate, with fixture holes, the size and attributes of a regular license plate as stipulated in state regulations.

The microchip can be re-programmed.

The microchip has an SAW structure.

The plate functions as follows:

The plate is to be mounted on the vehicle's bumper made of a dielectric material. In case there is a magnetic layer on the plate's backside, it can be mounted directly on metallic surfaces.

The plate should be mounted in a conventional way; there's no need of extra supply voltage connections.

HF-band alternating magnetic field generators should be placed at the specified portions of the road. When the plate is in their range, the resonator transforms energy of the magnetic field into electric current.

The resonator has large area if compared to conventional transponders, which minimizes the value of intensity of the alternating magnetic field required to trigger the microchip, due to positioning of the multi-turn frame along the perimeter of the plate.

When intensity of the magnetic field is at least 10 mA/m, the energy generated by the resonator is enough to trigger the microchip. It modulates the resonator circuit properties, which generates a modulated signal charged with identification data of the vehicle stored in the non-volatile memory unit of the integral microchip. Such modulated signal is thus unique for each vehicle.

The microchip modulates (manipulates) amplitude, frequency or phase of resonator oscillations. The modulated signal spectrum provides for data exchange at the rate of at least 1 Kbit/sec. Thus, the resonator generates a signal containing a codeword with identification data of the vehicle.

The current flowing through the resonator circuit generates its own alternating magnetic field, which, in turn, disturbs the external alternating magnetic field affecting the resonator. This disturbance is needed to proceed with demodulation of the signal by devices placed where the external alternating magnetic field generator is.

Induction license plates should be mounted on multiple vehicles. The non-volatile memory unit should store identification data of the vehicle. In case there are multiple vehicles equipped with induction license plates in the range of one and the same magnetic field generator, their resonators generate unique signals with resonant frequency modulations. Signals from different resonators are the processed discretely, one at a time, according to anti-collision ISO 15693, 1800-3 protocols (or compatible), to increase reliability of the demodulation process by providing a reasonable signal/noise ratio. The device generating the external magnetic field generates controlling signals at the same resonant frequency, which are then demodulated by the microchip to generate a modulating signal.

The plate can be produced by conventional means from standard materials, components and integrated microchips or chips with SAW structure.

Therefore, the induction license plate has a much wider application, since it is autonomous and can function in passive mode. In addition, it makes location of vehicles more precise and reduces the operating band, thus improving reliability of HF-band ultra-long-range induction vehicle detection and identification systems.

An induction reader comprises a magnetic frame placed under the roadway and connected to a matching node and a signal generator and processor. The frame makes up a rectangular HF-band oscillating circuit made of conducting materials. Its outer surface perimeter is 10-100 mm, the ratio between its shorter side to its longer side is ⅓ to ⅛, and the ratio between its perimeter and wavelength is 1/5 to 1/2. The longer side of the frame should be oriented to be across the road lane. The frame is enclosed in a dielectric case, implemented as a 50-200 mm high box and placed about 1000 mm deep under the roadway. The dielectric layer separating the frame from its environment is 50-200 mm wide.

The signal generator and processor modulates/demodulates, as well as encodes/decodes signals, and restricts access to data stored in memory.

The dielectric case of the frame has 1-5 dielectric coefficient, and its dielectric loss tangent is less than 10-2-10-3.

The frame is made either of metallic band, which is at least 0.1 mm wide, or of metallic tube with a rectangular or round profile.

The matching node's case is dielectric, and its dimensions are 200×120×70 mm. It is connected to the signal generator and processor via a control and power cable.

The oscillating circuit of the induction reader is self-adjusting, or it can be remotely adjusted, either manually or automatically.

The signal generator and processor can also verify the received data.

The case of the magnetic frame case is resistant to vibration, precipitation, corrosive fluids and mediums, sand-salt mix, petrol, mold, and can sustain temperatures of 170° C. or more while being laid under the roadway. It can also sustain pressure of a wheelset of 10 ton of more.

The signal generator and processor is connected to the computer (server) collecting and analyzing data necessary for traffic control.

The reader functions as follows:

The signal generator and processor generates HF-band signal (3-30 MHz) for the matching node connected to the frame in a dielectric case, placed 200-1000 mm deep under the roadway.

The matching node provides for remote adjustment (via a control panel) of resonant frequency of the magnetic frame.

When exposed to an alternating current, the frame generates an HF-band alternating magnetic field, which limits its range. The range itself is a virtual area around the frame with intensity of at least 10 mA/m, which is enough to trigger an induction license plate at least 1 m above the road. The range is affected by the size of the frame, how deep it is placed, its resonant frequency and the power of the signal generated by the signal generator and processor.

The perimeter of the frame is rather large if compared to wavelength, and due to that fact it is capable of covering the entire lane. The range of a 200×500 mm magnetic frame, placed under the 3200 mm-wide lane, is an area above the road with dimensions of at least 3200×600×1000 mm.

When a vehicle equipped with an induction license plate enters the reader's range, the magnetic field excites the plate and gets a response, which disturbs the field. This disturbance is transformed into an electric signal, which is fed to the reader (decoder) and then decoded to get identification data of the vehicle and transfer them to a remote computer.

Due to its design, the present reader can be used in HF-band ultra-long-range induction vehicle detection and identification systems.

The frame is to be made of metallic band or tube. The conductor should be about 48-102 mm wide and 0.1-1 mm thick. The ratio between the sides of the rectangular frame should be between about ⅓ and ⅛. The perimeter has a length from ⅕ to ½ of wavelength. The typical dimensions of the frame should be about 500×2000 mm if band is about 50 mm wide and 0.5 mm thick; the dielectric case is a box with dimensions of about 2500×500×200 mm.

The case of the frame creates a dielectric layer, which is at least 50 mm thick, between the frame and the roadway (conductive environment). This layer has a dielectric coefficient of 1-5, and its dielectric loss tangent is less than $10^{-2}$-$10^{-3}$. The case is about 50-200 mm thick, thus decreasing the effect of the environment on the Q-factor and resonant frequency of the oscillating circuit. The weight of the case is no more than 50 kg.

The case protects the frame and the matching device from external forces, primarily, mechanical ones. When placed under the roadway, the frame is exposed to major pressure—up to 10 tons—created by wheelsets of moving vehicles.

In addition, the case protects the frame and the unit from corrosive fluids and media (e.g., petrol, etc.), and temperatures from −60° C. to 200° C.

The pavement, under which the frame is placed, can have varying electrophysical properties (namely, magnetic capacity, dielectric coefficient, conductivity), which distort the signal.

The matching device, placed into the dielectric case together with the frame, provides for remote adjustment of the frame circuit to avoid those distortions. The device conducts self-diagnostics, measuring the stationary wave coefficient at the resonant frequency, and adjusts the circuit parameters either automatically or following the operator commands directed from a control panel or a remote computer.

The reader's frame is self-adjusting, by which we mean, that it automatically measures the stationary wave coefficient and adjusts the oscillating circuit to minimize fluctuations.

FIG. 1 is a diagram for placing the reader and the magnetic frame in relation to the road.

Figure 2:
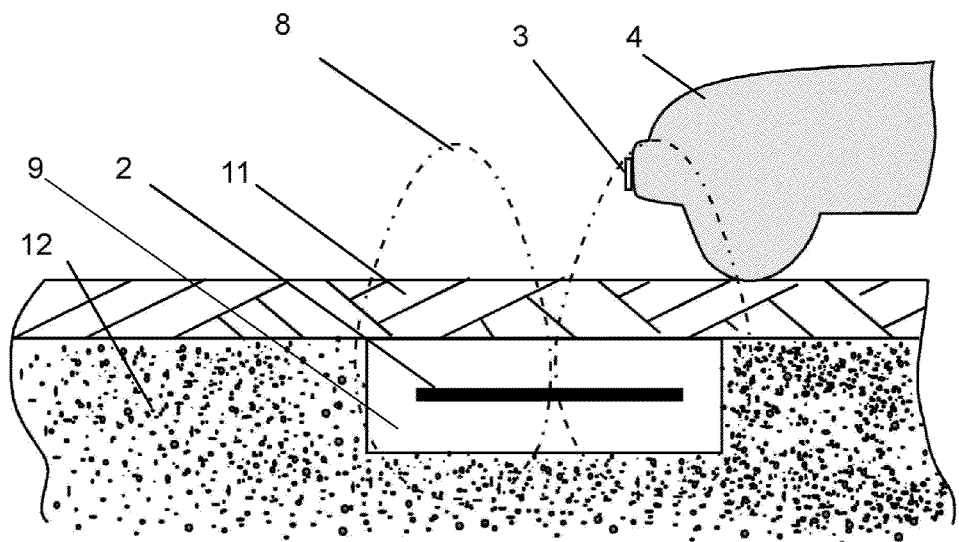
FIG. 2 illustrates pavement with a magnetic frame placed, in cross-section.

FIG. 2 illustrates pavement with a magnetic frame placed, in section.

FIG. 3 illustrates the induction license plate, front view.

FIG. 4 illustrates the induction license plate in section, side view.

FIG. 5 illustrates the magnetic frame in a dielectric case.

FIG. 6 is a schematic diagram of the induction vehicle detection and identification system.

The drawings bear the following marks:
1—a reader;
2—a magnetic frame placed under the roadway;
3—an induction license plate;
4—a vehicle;
5—a computer;
6—a lane;
7—a traffic line;
8—magnetic frame range;
9—a dielectric case of the magnetic frame;
10—computer ports for readers;
11—pavement;
12—ground-fill;
13—fixture holes;
14—the uppermost reflective layer of the induction license plate covered with identification data for visual recognition;
15—a multi-turn frame;
16—a microchip;
17—a combination of letters and numbers (on the uppermost layer of the induction license plate);
18—a dielectric plate;
19—the backside of the dielectric plate covered with a magnetic layer;
20—induction connection between the resonator of the induction license plate and the magnetic frame;
21—metallic band on the magnetic frame;
22—a matching node;
23—a cable for connecting the matching node of the magnetic frame to the signal generator and processor;
24—a signal generator and processor (a reader);
25—a control panel for the matching node;
26—a reader's port for turnpike control.

The reader can be produced from standard materials, radio and electronic components and components using sheet and shaped metal processing. The signal generator and processor can be implemented on the basis of existing stock units, such as HF Long Range reader ID ISC.LR(M)2500 by FEIG Electronic.

Therefore, the induction reader has a much wider application, since it provides for identification of vehicles and improves reliability of ultra-long-range induction systems.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. An induction reader comprising:
   a rectangular magnetic frame placed under the roadway;
   a signal formating and processing node and a matching node, connected to the magnetic frame;
   wherein the magnetic frame forms an HF-band oscillating circuit;
   wherein the magnetic frame is made of conductive material, and wherein the outer perimeter of a cross section the conductive material is 10-100 mm,
   wherein a ratio between a short side of the magnetic frame and a long side is ⅓ to ⅛ of the wavelength, and
   wherein a ratio between a perimeter of the magnetic frame and a wavlength to ⅕ to ½;
   wherein a longer side of the magnetic frame is oriented transverse to the roadway;
   wherein the magnetic frame is placed in a dielectric sheath formed in a substantially parallelepiped shape with a minimum height of 50 mm;
   wherein the magnetic frame placed in a dielectric shell is located at not more than 1 meter deep under the roadway, and
   wherein a dielectric layer separating the magnetic frame from its environment is not less than 50 mm thick.

2. The reader of claim 1, wherein the formation and signal processing mode modulates/demodulates, as well a encodes/decodes signals, and restricts access to data stored in memory.

3. The reader of claim 1, wherein the dielectric permittivity of the dielectric sheath of the frame is from 1 and to 5, and the dielectric loss tangent is not more than $10^{-2}$-$10^{-3}$.

4. The reader of claim 1, wherein the magnetice frame is made of a metal strip with a thickness of not less than 0.1 mm.

5. The reader of claim 1, wherein the oscillation circuit of the reader is a self-adapting.

6. The reader of claim 1, wherein the dielectric sheath is resistant to vibration, precipitation, aggressive fluides, o sand and salt mixture, gasoline, and mold fungi, and has a heat resistance when being placed in the asphalt of not in less than 170° C., and a pressure wheel pair at least 10 tons.

* * * * *